United States Patent [19]
Heck, deceased

[11] Patent Number: 5,340,472
[45] Date of Patent: Aug. 23, 1994

[54] APPARATUS FOR PROCESSING WASTES FROM THE MACHINING OF FERROMAGNETIC MATERIALS

[75] Inventor: Alfred Heck, deceased, Late of Eupen, Belgium, Brigitte Heck and Pierre Heck legal representatives

[73] Assignee: Filterwerk Mann & Hummel GmbH, Ludwigsburg, Fed. Rep. of Germany

[21] Appl. No.: 992,631

[22] Filed: Dec. 18, 1992

[30] Foreign Application Priority Data

Dec. 18, 1991 [DE] Fed. Rep. of Germany ....... 4141676

[51] Int. Cl.$^5$ .............................................. B01D 35/06
[52] U.S. Cl. ............................. 210/173; 210/195.1; 210/197; 210/223; 210/253; 210/258; 210/296; 209/3; 209/39; 209/224; 209/232; 241/46.01; 241/92
[58] Field of Search ............... 210/173, 195.1, 197, 210/222, 223, 296, 253, 257.1, 258, 259, 695, 772; 209/3, 224, 232, 39; 241/46.01, 92

[56] References Cited

U.S. PATENT DOCUMENTS

| | | | |
|---|---|---|---|
| 2,398,725 | 4/1946 | Schutte | 209/232 |
| 3,143,496 | 8/1964 | Maretzo | 210/222 |
| 3,257,081 | 6/1966 | Brown et al. | 210/223 |
| 3,723,309 | 3/1973 | Garcia | 210/195.1 |
| 3,865,629 | 2/1975 | Dankoff et al. | 209/3 |
| 4,851,119 | 7/1989 | Bergloff | 210/400 |
| 5,147,554 | 9/1992 | Heck | 210/695 |

FOREIGN PATENT DOCUMENTS 3725528 3/1988 Fed. Rep. of Germany.
3739496 6/1989 Fed. Rep. of Germany.

*Primary Examiner*—Matthew O. Savage
*Attorney, Agent, or Firm*—Evenson, McKeown, Edwards & Lenahan

[57] ABSTRACT

A method for processing wastes from the machining of ferromagnetic materials in which the wastes are mixed with a washing solution in a first tank and oil or oil-and-water emulsion adhering to the wastes is dissolved. Ferromagnetic components of the wastes are then separated from the washing solution in the first tank by means of a magnetic field, and non-magnetic components are then subjected to a washing in a following second tank. The ferromagnetic components are fed to an additional tank where they are washed again. The separated and degreased components are then filtered out of the washing liquids using suitable filtering apparatus.

7 Claims, 3 Drawing Sheets

APPARATUS FOR PROCESSING WASTES FROM THE MACHINING OF FERROMAGNETIC MATERIALS

BACKGROUND OF THE INVENTION

This invention relates to a method for processing wastes from the machining of ferromagnetic materials, and to an apparatus for practicing the method of the invention.

German published patent application No. DE 3,739,496 discloses a band filtering apparatus with which contaminated fluid, especially machining fluid which is used in the cutting of metals, can be cleaned. Such a band filtering apparatus is provided with a dirt chamber to which the fluid is fed. Under this dirt chamber there is a filter base on which there is placed a filter fleece. The filter fleece is advanced automatically step by step in accordance with the amount of waste deposited on it. The wastes are removed from the apparatus with the filter fleece and pass into a container. In addition to a preponderance of metal chips or metal dust, these wastes also contain abrasive residues, such as corundum material. Moreover, these wastes are also heavily laden with oil or emulsion.

The disposal of this mixture without further processing can be performed only by approved refuse disposal companies and only at special dumps. Attempts have already been made to feed this mixture to an incinerator. Due, however, to the metal components as well as corundum, this is an uneconomical and difficult solution. Melting the metals in a melting furnace is also disadvantageous due to their high content of foreign substances.

According to the "Technische Anleitung Abfall" [Technical Instructions Regarding Waste] in force in the Federal Republic of Germany, recycling of wastes is preferred over conventional waste disposal. This regulation expressly applies also to hazardous wastes. The recycling process must meet the requirements that 1) the recycling be technically possible; 2) the recycling costs be reasonable, and 3) that a market exists or can be created for the substances or energy obtained. Until these criteria are satisfied, the wastes cannot be properly disposed of.

Published German patent application No. DE 3,725,528 discloses an apparatus for pressing or dewatering suspensions, sludges or the like. It has been found, however, that even under high pressures it is not possible to remove the oil adhering to the wastes.

Despite the foregoing state of the art, there remained a need for methods and apparatus for disposing of residues from machining of metals.

SUMMARY OF THE INVENTION

It is therefore the object of the invention to provide a method and apparatus for processing and separating wastes from machining of ferromagnetic metals.

It is also an object of the invention to provide a method and apparatus for processing waste from machining of ferromagnetic metals which can effectively separate ferromagnetic metal particles from other material.

A further object of the invention is to provide a method and apparatus for processing waste from machining of ferromagnetic metals which can separate oil from metal particles.

Another object of the invention is to provide a method and apparatus which facilitates recycling of waste material from machining of ferromagnetic metals.

A still further object of the invention is to provide a method and apparatus for processing waste from machining of ferromagnetic metals at reasonable cost.

These and other objects of the invention are achieved in accordance with the present invention by providing a method of processing wastes from machining of ferromagnetic materials which comprise a mixture of magnetic and non-magnetic components and are contaminated with oil or an oil-in-water emulsion, the method comprising introducing the machining wastes and a first washing solution into a first washing tank and washing the wastes to release oil or oil-in-water emulsion from the wastes, applying a magnetic field to the first washing tank and separating magnetic components of the machining wastes from other components of the wastes by attracting the magnetic components to a wall of the first tank under the influence of the magnetic field, transferring the first washing solution with the non-magnetic components from the first washing tank to a second tank while retaining the magnetic components in the first tank under the influence of the magnetic field, introducing a second washing solution into the first washing tank and deactivating the magnetic field to release the magnetic components from the wall of the first tank into the second washing solution, transferring the second washing solution with the magnetic components from the first washing tank to a third tank, filtering out the washed non-magnetic components, and filtering out the washed magnetic components.

In accordance with a further aspect of the invention, the foregoing objects are also achieved by providing an apparatus for processing wastes from machining of ferromagnetic materials comprising a first washing tank, means for introducing a controlled amount of machining waste into the first washing tank, means for introducing a washing solution into the first washing tank, means for applying a magnetic field to the first washing tank, whereby magnetic components of machining waste in the first tank will be attracted to a wall of the tank, a second washing tank, a third washing tank, means for transferring a wash solution from the first washing tank selectively to one of the second and third washing tanks, a first filter unit for filtering magnetic components from a washing solution, a second filter unit for filtering non-magnetic components from a washing solution, means for transferring a washing solution from the third washing tank to the first filter unit, and means for transferring a washing solution from the second washing tank to the second filter unit.

An important advantage of the method described is, for one thing, the separation of the wastes into the ferromagnetic components and the other components such as corundum, for example, and for another the separate, subsequent cleaning of the separated components. This separate cleaning has the advantage that it achieves a washing procedure optimized in accordance with the manner in which the oil adheres to the particular component. Since grinding wastes are produced largely from the machining of steel parts and castings, such as crankshafts, camshafts, connecting rods and brake disks, the separation of these metallic grinding wastes from the other residues in solid form can be achieved by a magnetic separator.

Another advantage of the method of the invention is that, after the oil or emulsion has been released from the components, a simple separation of the components and wash solution is performed by means of separate filtering systems. Here, again, the filters or filtration agents can be adapted to the particular component to be removed, so that optimum filtration action is achieved for each component.

According to an advantageous further development of the invention, provision is made for performing the wash in tanks arranged in cascade. In this case it is advantageous to form a separate cascade for each of the components to be washed, so that each of the components is subjected to several washings.

According to a further advantageous embodiment of the invention, fresh or regenerated washing solution is fed in the cascade to whichever tank was last. This assures that the cleaning action of the washing solution always remains constant in the individual tanks and the entire process can be continuous.

In a further development of the invention the first tank is equipped with a tangential feed tube. This has the advantage that even as the washing solution is being fed into the tank or as the contents of the tank are being stirred, a defined flow of fluid in the tank is achieved.

According to further embodiment, a magnetic field can also be generated for the tank following the first tank. This has the advantage that the entire contents of the tank do not have to be transferred to the next washing tank. Instead the ferromagnetic components are first deposited on the inner walls of the tank. The washing fluid can then be pumped out except for a small residue, and then the ferromagnetic components can be washed down from the inner walls of the tank with the washing fluid from the next washing tank, and fed to the next tank.

In accordance with a further embodiment, a buffer tank is provided for spent washing solution. Any ferromagnetic components or corundum remaining in the washing solution recycled to the buffer tank will settle in the fluid while it is still and can be recycled through a discharge valve into one of the tanks.

In a further embodiment of the invention, the filter for the ferromagnetic components is a continuous filter press which removes these components in batches.

For the other components a suction filter is advantageously provided. Such a suction filter operates continuously and has the advantage that due to its relatively great capacity, there is no need for an additional buffer tank for the washing solution.

The content of the tank is kept moving by means of a stirrer and/or a circulating pump. The choice of the different apparatus depends on the nature of the components which are contained in the corresponding tank and on how an optimum washing can be achieved.

It has been found that the residues tend to become lumpy. To break up any such lumps, a disintegrator can be provided in one or more of the recirculating lines. This disintegrator advantageously consists of a plurality of knives or dissolver disks which are arranged one above another in the axial direction on a shaft. This shaft extends into a tube through which the container contents are pumped and rotates at high speed. For example, the shaft may be rotated at a speed of about 3000 rpm. To prevent wear on the tube walls in the knife area, a wear shield may be applied to the tube wall.

Other features of preferred embodiments of the invention may be apparent from the following description and/or the accompanying drawings. The disclosed features, either individually or in the form of subcombinations, can be used in the processing of waste from machining of ferromagnetic metals and in other fields, and may constitute independently patentable subject matter for which protection is also sought as part of the presently claimed invention.

BRIEF DESCRIPTION OF THE DRAWINGS

The invention will be described in further detail with reference to representative preferred embodiments shown in the accompanying drawings, which are merely illustrative of the invention and are not intended to be limiting. In the drawings.

DETAILED DESCRIPTION OF PREFERRED EMBODIMENTS

Figure 1:
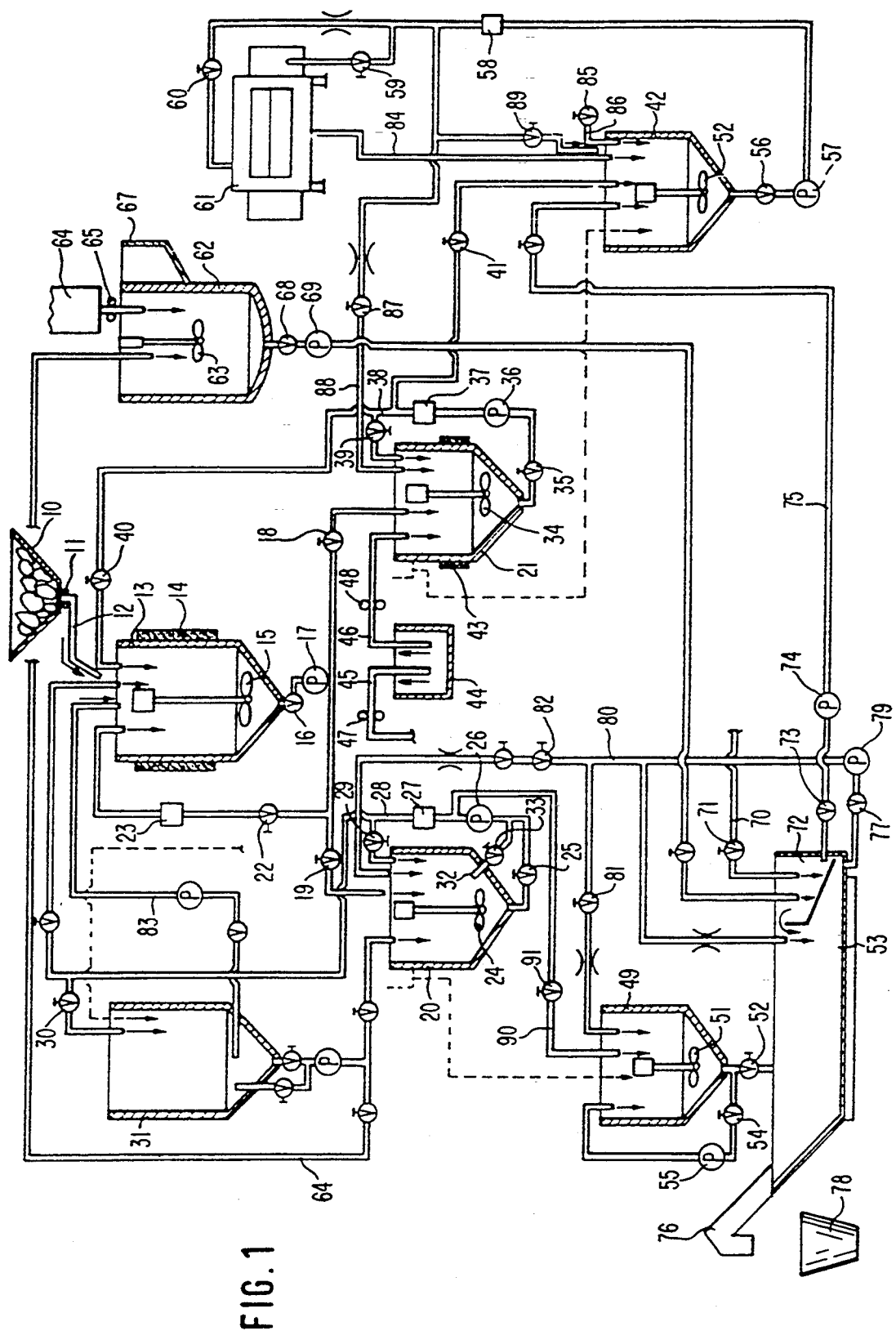
FIG. 1 is a schematic representation of an apparatus for carrying out the waste processing method of the invention.

FIG. 1 shows the components of an apparatus for carrying out the method of the invention to process wastes from the machining of ferromagnetic materials. A tank 10 is provided to contain the waste material contaminated with water and oil. On this tank there is a feeding means 11 as well as a conveyor pipe 12 connected to the tank outlet and leading to a tank 13. Tank 13 is provided on its circumference with at least one magnet 14. These magnets are disposed outside of the tank and produce a magnetic field in the tank. The magnets can be moved away from the tank wall. The at least one magnet is movable between a first position in which a magnetic field is applied to the tank and a second position in which the magnetic field in the tank is effectively deactivated. For this purpose suitable devices are provided for swinging the magnets away from the wall of the tank, and these magnet moving devices can be used to turn the magnetic field within the tank on and off.

Also provided in tank 13 is a stirrer 15. The outlet funnel of the tank can be shut off by a valve 16. Under the valve 16 there is a pump 17 whose discharge goes to valves 18 and 19 which in turn control the feed into the tanks 20 and 21. The discharge of pump 17 is also connected to a recirculation line leading through a valve 22 and a disintegrator 23 back to the inlet area of tank 13.

In tank 20 there is also a stirrer 24. Tank 20 is provided at its bottom with an outlet on which there is a valve 25. This valve is connected by a line to a pump 26 and a disintegrator 27. The line 28 which passes through the disintegrator leads on the one hand through a valve 29 into the inlet area of tank 20, and on the other hand through a valve 30 into another tank 31 which is provided as a buffer tank for exhausted washing fluid. In an elevated portion of the bottom of tank 20 there is an outlet 32 for the removal of fluid. This outlet 32 provided with a valve 33.

Tank 21 also has a stirrer 34. On this tank there is provided at the bottom a valve 35 followed by a pump 36 and a disintegrator 37. A line 38 connected to the disintegrator outlet leads through a valve 39 to the inlet area of tank 21, through a valve 40 to the inlet of tank 13, and through a valve 41 to the inlet of a tank 42.

On tank 21, permanent magnets 43 are also provided. Like the magnets 14 on tank 13, magnets 43 can also be moved away from the wall of tank 42 in order to turn the magnetic field in the interior of tank 42 on and off.

A cleaning agent tank 44 is provided to supply tanks 21 and 20 with cleaning agent. The cleaning agent is fed through lines 45 and 46 and metering devices 47 and 48 to the tanks 20 and 21, respectively.

Additional tanks (tank 49, tank 42) are each connected one of tanks 20 and 21, respectively. Tanks 49 and 42 are each equipped with a stirrer 51, 52. The outlet of tank 49 leads through a valve 52' to a continuous suction filter 53. The outlet of tank 49 also leads to a return line which passes through a valve 54 and a pump 55 back to the inlet of tank 49.

The discharge from tank 42 is carried through a valve 56, a pump 57, a disintegrator 58, and through valves 59 and 60 to a continuous filter press 61.

A peripheral tank 62 with a stirrer 63 is also provided. Spent washing fluid is fed to tank 62 through a line 64. This washing fluid contains oil and water as well as emulsion. A de-emulsifying agent can be fed from a tank 66 to tank 62 through a metering device 65. This de-emulsifier causes the emulsion to separate. The oil that separates in tank 62 is transferred to an oil holding tank 67. The water which settles toward the bottom of tank 62 passes through a valve 68 and through a pump 69 into the inlet area 72 of the continuous suction filter 53. A line 70 with a valve 71 also extends to the filter inlet area 72 through which fresh water can be fed to the filter 53. The fresh water from the filter inlet area 72 can be conveyed through a valve 73, a pump 74 and a line 75 to tank 42. The grinding wastes filtered out in the suction filter 53 pass through the discharge spout 76 into a container 78. The filtered fluid is collected at the bottom of the filter unit 53 and passes through valve 77, pump 79 and line 80, and either through another valve 81 to tank 49 or through another valve 82 to tank 20.

There is also a return line 83 with an interposed valve and a pump leading from tank 31 to tank 13. A line 84 furthermore leads from the continuous filter press 61 to tank 42. There is also a line 86 leading through a valve 85 for feeding fresh water into tank 42.

The method of the invention for processing grinding wastes is described as follows:

A desired amount of grinding wastes is fed by the metering device 11 through line 12 into tank 13. A predetermined amount of washing solution also is supplied to tank 13 from the buffer tank 31. With agitation by the stirrer 15 and recirculation the entire content of tank 13 by pump 17 through valve 22 and disintegrator 23, any lumps of the grinding waste components are broken up, and oil adhering to the grinding wastes is released.

During the foregoing cleaning phase, no magnetic field is as yet produced on the inner walls of the tank. Not until after the expiration of a predetermined period of time sufficient to effect the release of oil from the grinding waste components, are the magnets 14 brought against the wall of tank 13. The magnets thus produce a magnetic field in the tank 13, with the result that the ferromagnetic components are deposited on the inner wall of the tank, so that only the other components, such as corundum and also the oil or emulsion, remain in the washing solution. The washing solution as well as the corundum or oil in it is then conveyed through valve 16, pump 17 and valve 19 to tank 20. In tank 20 both a stirring of the liquid by the stirrer 24 and recirculation of the tank contents through valve 25, pump 26, disintegrator 27, pipe 28 and valve 29 take place, so that any oil still adhering to the corundum is removed in this washing stage. Detergents (surfactants) are furthermore metered to tank 20 from tank 44 through the metering apparatus 47 and line 45, in order to assure optimum washing of the oil out of the grinding wastes.

During the washing process in tank 20, the magnetic field in tank 13 is removed by moving away the magnets 14, and the washing fluid in tank 21 is conveyed to tank 13. With this washing fluid from tank 21 the ferromagnetic components are removed from tank 13 through valve 16, pump 17 and valve 18 and conveyed to tank 21. In tank 21, stirring is also performed by means of stirrer 34 and recirculation is produced through valve 35, pump 36, disintegrator 37, line 38 and valve 39. Detergent from tank 44 can also be supplied to tank 21, so that here again the ferromagnetic components are washed in an additional stage. Magnets 43 are again provided on tank 21 and cause the ferromagnetic components to accumulate on the inner walls of the tank. After the ferromagnetic components have been separated from the washing solution, the solution is returned through valve 35, pump 36, line 38, valve 40, to tank 13 into which a fresh charge of the waste has been introduced for cleaning. After the magnets 43 on tank 21 are disengaged, the ferromagnetic components are flushed out of tank 21 with an amount of fluid taken from tank 42, and fed through valve 35, pump 36 and valve 41 to tank 42. Here another washing is performed in an additional cleaning stage, with stirring by means of stirrer 52 and with recirculation of the entire tank content through valve 56, pump 57, disintegrator 58, and valve 89. After the washing in tank 42 is complete, the contents the tank are conveyed through the discharge line and valve 60 to the continuous filter press 61. There the solid components are filtered out, and the liquid can be fed through line 84 back to tank 42.

For the continued treatment of the components contained in tank 20 an additional washing tank 49 is provided. After a certain settling time, the solid components in the outlet funnel of tank 20 are fed through valve 25, pump 26, line 90 and valve 91 to tank 49 which contains washing liquid. In tank 49 a mixing is again carried out by means of a stirrer 51, so that in this washing phase any residual amounts of oil on the abrasive components can be removed. After a settling period, the abrasive residues in the outlet funnel of tank 49 are fed through valve 52' into the continuous suction filter 53. A suitable continuous suction filter is known, for example, from published European Patent No. EP 24,041 and is not described in further detail here.

The components removed by filtration pass through the discharge spout 76 into a container 78. These components are free of emulsion or oil and can be disposed of with no problem. The filtered fluid passes through valve 77, pump 79 and either through valve 81 into tank 49 or through valve 82 into tank 20. The ferromagnetic components filtered out by means of the band filter press 61 are also essentially free of oil and emulsion and can be recycled with no problem.

While washing liquid is being fed to tank 13 from the buffer tank 31 or from tank 20 or 21, the washing liquid in tank 42 is regenerated by means of fresh water or reprocessed washing liquid supplied through line 75. This system assures that the washing liquid contained in the last tanks of the two cascades has a high degree of purity which can be kept constant by the regulated and controlled introduction of fresh solution or fresh water. The entire process may be controlled, for example, through a simple timing control or by using a known process control system.

Figure 2:
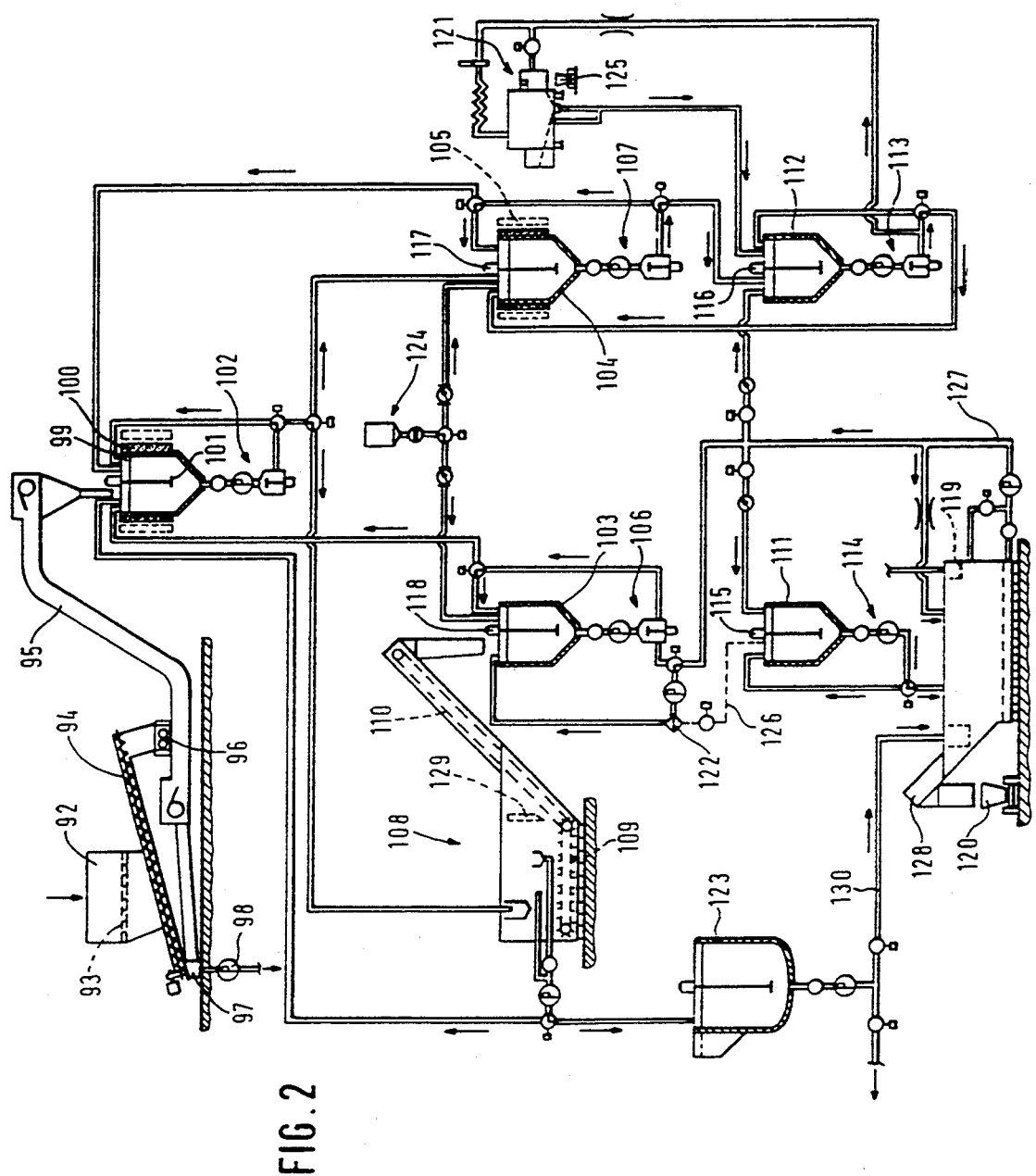
FIG. 2 is an alternate embodiment of an apparatus for carrying out the waste processing method of the invention.

The variant apparatus embodiment shown in FIG. 2 starts with a hopper 92 provided with a shaker screen 93. The wastes are dumped into hopper 92, and the shaker screen 93 holds out coarse contaminants. The screened wastes pass into a metering screw conveyor 94 and from there onto a metering feeder 95. This metering feeder 95 can be, for example, a scraper flight conveyor. If desired, a fine grinder 96 can be provided between the screw conveyor 94 and the metering feeder 95.

Both the metering screw conveyor 94 and the metering feeder 95 are slightly inclined, so that any very oily wastes can drain. The oil collects in a tank 97 and can be conveyed away by a pump 98.

The metering feeder 95 advances a desired amount of the waste into a separating tank 99 which has on its exterior magnet elements 100 whose magnetic effect inside the tank can be turned on and off by appropriate means. If the wastes are not ferromagnetic, it is then also possible to construct these separating tanks without magnet elements 100 or to shut off the magnets. In such a case, the wastes are subjected only to washing to remove the oil or emulsion adhering to them.

A stirrer 101 is provided in the separating tank. At the outlet of the separating tank 99 are a valve, a pump, a disintegrator to be described below, and a changeover valve. Together these devices constitute a conveyor unit 102. A second washing tank 103 is provided, as well as a third washing tank 104 which operates in parallel with washing tank 103. The washing tank 104 is also equipped with magnet elements 105. At the outlets of washing tanks 103 and 104 there are conveyor units 106 and 107, respectively, each similar in construction to conveyor unit 102.

Furthermore, a scraper flight conveyor tank 108 is integrated into the entire system. This tank has a scraper flight belt 109 and a discharge belt 110.

Two so-called flushing tanks 111 and 112 are also arranged in parallel. Flushing tank 111 is provided at its outlet with a pump unit 114 consisting of a valve, pump and changeover valve.

The washing tanks 103 and 104 as well as the flushing tanks 111 and 112 are provided with stirrers 115, 116, 117 and 118.

Under the flushing tank 111 is a continuous suction filter 119. A container 120 for the filtered-out material is provided adjacent the discharge spout of the continuous suction filter 119.

A continuous filter press 121, a reverse flush filer 122, a de-emulsifier tank 123 for the oil-and-water emulsion and a metering system 124 for surfactants or detergent substances are also provided.

The operation of the entire process is described as follows:

Through the hopper 92 a desired amount of waste arrives on the shaker screen 93 and passes from there via the metering screw conveyor 94 to the metering feeder 95. The metering feeder 95 feeds a predetermined amount of waste into the separating tank 99 which contains washing solution. The washing solution with the waste is stirred in the tank by constant operation of the stirrer 101, and also recirculated by the conveyor unit 102. The disintegrator in conveyor unit 102 breaks up lumps of the waste.

After a sufficient wash period the magnet elements 100 are activated so that ferromagnetic components of the waste in tank 99 are drawn to the inner wall of the tank. The washing solution and the remaining components suspended in the tank are then conveyed to the scraper flight tank 108. The solid components which have settled on the bottom of scraper flight tank 108 can be carried by means of the scraper flight belt 109 from the tank 108 into the washing tank 103 where the solid components are washed again. The solid components in tank 103 comprise primarily corundum or other abrasive materials.

In addition to being stirred by stirrer 118, the contents of tank 103 are recirculated by the conveyor unit 106 through the disintegrator contained therein, in order to achieve a good washing action. Detergent substances are supplied from the metering system 124 to the tank 103 as required.

After the wash solution containing non-magnetic components is emptied from separating tank 99 to tank 103, washing liquid from the washing tank 104 is introduced into tank 99. The magnetic action of the magnet elements 100 is then turned off, and washing liquid is conveyed back to washing tank 104. When the magnetic action of the magnet elements 100 is shut off, the ferromagnetic wastes are released from the walls of tank 99 and flushed with the washing liquid out of tank 99 into the washing tank 104. There the ferromagnetic wastes are washed again with stirring by the stirrer 117, so that further oily cutting fluid is removed from the ferromagnetic components. Here, too, the tank contents are recirculated through the feeder unit 107 with simultaneous break-up of lumps of material. After sufficient washing has taken place, the ferromagnetic components are deposited by means of the magnet elements 105 onto the inner wall of tank 104. The washing liquid can then be pumped into the separating tank 99 for initially washing a new charge of waste material introduced by metering feeder 95 into tank 99.

The ferromagnetic components collected on the inside wall of tank 104 can be transferred to the flushing tank 112 by means of a flushing liquid (water) supplied from flushing tank 112. In flushing tank 112, the components are intensively mixed once again by the conveyor unit 113 and the stirrer 116. The entire content of the flushing tank 112 is then fed to the continuous filter press 121. In continuous filter press 121 the solid components (ferromagnetic components) are filtered out of the liquid. These solid components pass into a container 125. The filtered-out solid components are substantially oil-free and can be reused as raw materials.

The liquid in the washing tank 103 with the non-magnetic components contained therein passes through the feeder unit 106 to a reverse-flushing filter 122. The solid components accumulate in this reverse-flushing filter 122. The reverse-flushing filter 122 is equipped with a pressure monitor for determining the resistance to flow, so that reverse flushing can be performed at the right time. When the filter is backflushed with flushing liquid, the wastes accumulated in the filter are delivered through line 126 to the flushing tank 111. In this flushing tank there is a flushing liquid which is stirred by the conveyor unit 114 and by the stirrer 115.

After sufficient flushing the liquid passes into the continuous suction filter 119. The cleaned liquid is conveyed from this continuous suction filter 119 through line 127 to the reverse flushing filter 122 and thus backflushes the filter.

The solid components filtered out in the continuous suction filter 119 are substantially oil-free and pass through the discharge spout 128 into a container 120.

An oil weir 129 is disposed in the scraper flight tank 108 and prevents any oil that may be floating on the surface of the liquid from being carried by the belt 110 into the tank 103.

Spent washing liquid is fed from the scraper flight tank 108 into a de-emulsifier tank 123, where it can be separated into its oil and water components, if necessary with the aid of suitable emulsion breakers or de-emulsifying agents. The oil-free water can be recycled to the entire circuit, i.e., through line 130 to the continuous filter press. The oil which collects at the surface of the de-emulsifier tank can be collected and reprocessed.

Alternatively, or to enhance the breaking up of lumps of material as well as the separation of oil and emulsion from the wastes, a system for generating ultrasonic energy can be arranged on one or more of the pipes through which the wastes are carried by the liquid, for example the line in the area of conveyor unit 107. If desired, such a system can also be provided on one of the tanks.

If ferromagnetic components make their way to the second washing tank 103, it is also possible to arrange magnets on this tank, so that the ferromagnetic components will accumulate on the inside walls of the washing tank and, after a certain time, they can be removed by flushing them back to separating tank 99.

Figure 3:
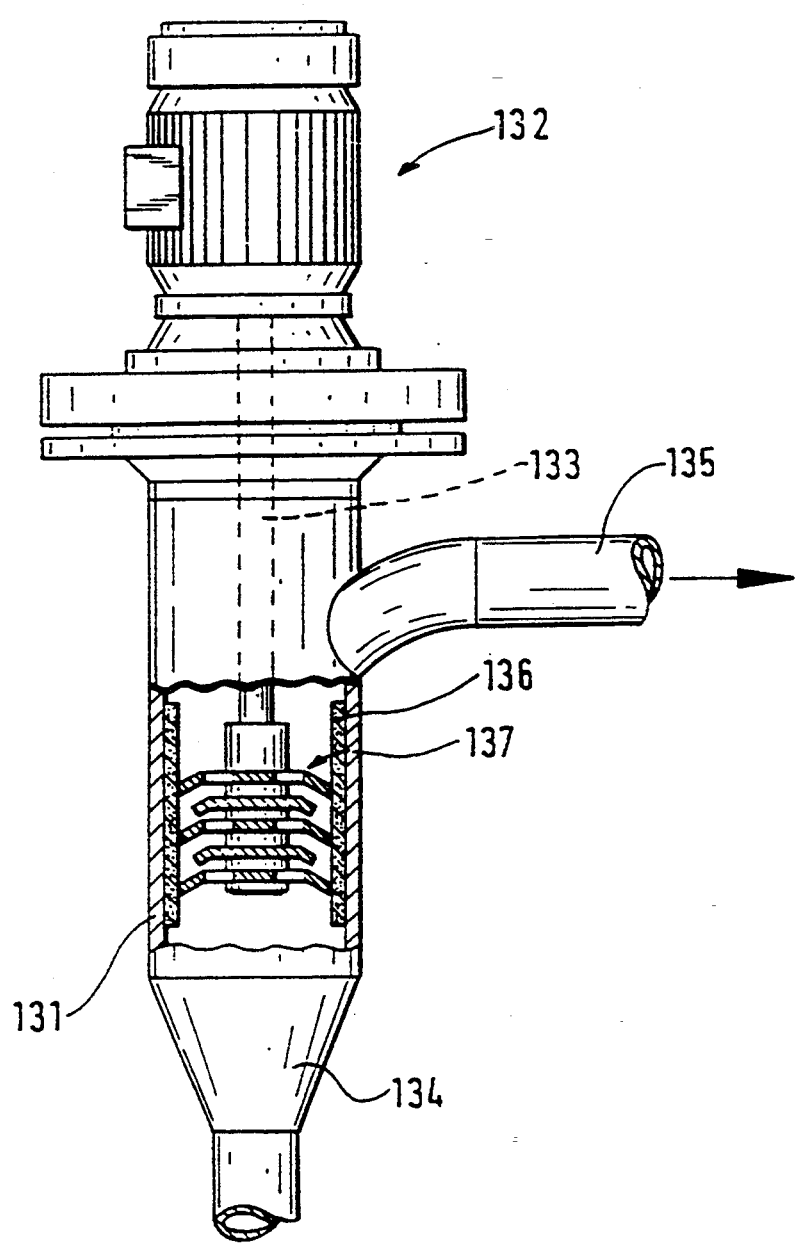
FIG. 3 shows an apparatus for breaking up wastes.

The disintegrators shown in the conveyor units 102, 106, 107 and 113 are illustrated in greater detail in FIG. 3. These disintegrators each comprise a casing 131 on which a motor 132 is mounted. The motor 132 has a shaft 133 on which a plurality of so-called dissolver disks 137 are mounted. As can clearly be seen in FIG. 3, the dissolver disks 137 have different diameters and are each provided at their outer circumference with slightly bent tooth elements. The bottom dissolver disk additionally has through-bores in a middle part of its diameter. Part of the liquid flows through these throughbores, while the other part flows past the outer circumference of the dissolver disk and is struck by the teeth, so that the lumps in this part are broken up. The liquid which flows through the bores is directed to the next, smaller dissolver disk and its tooth elements, so that the lumps contained in this part of the liquid are also broken up. This first disintegrator stage is followed by another overlying disintegrator which again comprises a large dissolver disk and a small one. At the end is a large dissolver disk.

The liquid with the components contained therein flows through the disintegrator from the bottom up, i.e., the liquid is fed to the connection 134 and leaves the disintegrator through the outlet tube 135. In the area of the disintegrator, the case 131 is provided with a wear-resistant liner 136.

The foregoing description and examples have been set forth merely to illustrate the invention and are not intended to be limiting. Since modifications of the described embodiments incorporating the spirit and substance of the invention may occur to persons skilled in the art, the scope of the invention should be construed to include all variations falling within the ambit of the appended claims and equivalents thereof.

What is claimed is:

1. An apparatus for processing wastes from machining of ferromagnetic materials, said apparatus comprising
   a first tank
   means for introducing a controlled amount of machining waste into said first tank;
   means for introducing a washing solution into said first tank;
   means for applying a magnetic field to said first tank and attracting magnetic components of machining waste in said first tank to an outer wall of the tank;
   a second tank;
   a third tank;
   means for transferring a wash solution from said first tank selectively to either one of said second and third tanks;
   a first filter unit for filtering magnetic components from a washing solution;
   a second filter unit for filtering non-magnetic components from a washing solution;
   means for transferring a washing solution from said third tank to said first filter unit, and
   means for transferring a washing solution from said second tank to said second filter unit.

2. A apparatus according to claim 1, wherein said means for applying a magnetic field comprise at least one magnet movable between a first position in which a magnetic field is applied to the tank and a second position in which the magnetic field in the tank is effectively deactivated.

3. An apparatus according to claim 1, further comprising means operatively associated with each said tank for circulating solution within the associated tank.

4. An apparatus for processing wastes from machining of ferromagnetic materials, said apparatus comprising
   a first tank;
   means for introducing a controlled amount of machining waste into said first tank;
   means for introducing a washing solution into said first tank;
   means for applying a magnetic field to said first tank, whereby magnetic components of machining waste in said first tank will be attracted to a wall of the tank;
   a second tank;
   a third tank;
   means for transferring a wash solution from said first tank selectively to one of said second and third tanks;
   a first filter unit for filtering magnetic components from a washing solution;
   a second filter unit for filtering non-magnetic components from a washing solution;
   means for transferring a washing solution from said third washing tank to said first filter unit;
   means for transferring a washing solution from said second washing tank to said second filter unit, and
   circulating means comprising a stirrer in each said tank for circulating solution therein.

5. An apparatus for processing wastes from machining of ferromagnetic materials, said apparatus comprising
   a first tank
   means for introducing a controlled amount of machining waste into said first tank;
   means for introducing a washing solution into said first tank;
   means for applying a magnetic field to said first tank, whereby magnetic components of machining waste in said first tank will be attracted to a wall of the tank;
   a second tank;
   a third tank;

means for transferring a wash solution form said first tank selectively to one of said second and third tanks;

a first filter unit for filtering magnetic components from a washing solution;

a second filter unit for filtering non-magnetic components form a washing solution;

means for transferring a washing solution from said third washing tank to said first filter unit;

means for transferring a washing solution form said second washing tank to said second filter unit, and circulating means comprising a recirculation line and recirculating pump operatively associated with each said tank for circulating solution therein.

6. An apparatus according to claim 5, further comprising disintegrating means on said recirculation lines for breaking up lumps of material in solutions circulated therethrough.

7. An apparatus according to claim 5, wherein said disintegrating means comprises an area of enlarged cross-section on the recirculation line, a rotatable shaft extending axially into said area of enlarged cross-section, a plurality of successive disks or blades mounted on said shaft, and a wear liner adjacent an inner wall of said area of enlarged cross-section surrounding said disks or blades.

* * * * *